United States Patent
Cheng et al.

(10) Patent No.: US 7,460,370 B2
(45) Date of Patent: Dec. 2, 2008

(54) HEAT DISSIPATION ASSEMBLY

(75) Inventors: Nien-Tien Cheng, Tu-Cheng (TW); Chen-Shen Lin, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 11/309,850

(22) Filed: Oct. 12, 2006

(65) Prior Publication Data
US 2007/0279866 A1    Dec. 6, 2007

(30) Foreign Application Priority Data
Jun. 2, 2006    (CN) ................... 2006 1 0060965

(51) Int. Cl.
*H05K 7/20* (2006.01)

(52) U.S. Cl. ................... 361/700; 361/695; 361/698; 165/104.33

(58) Field of Classification Search ............... None
See application file for complete search history.

(56) References Cited

U.S. PATENT DOCUMENTS

| | | | |
|---|---|---|---|
| 5,581,443 A * | 12/1996 | Nakamura et al. | 361/705 |
| 6,141,215 A * | 10/2000 | Podwalny et al. | 361/687 |
| 6,407,921 B1 * | 6/2002 | Nakamura et al. | 361/700 |
| 6,442,025 B2 * | 8/2002 | Nakamura et al. | 361/695 |
| 6,542,360 B2 * | 4/2003 | Koizumi | 361/687 |
| 6,822,856 B2 * | 11/2004 | Fujiwara | 361/681 |
| 6,839,231 B2 * | 1/2005 | Fleck et al. | 361/687 |
| 7,209,356 B2 * | 4/2007 | Lee et al. | 361/719 |
| 7,212,404 B2 * | 5/2007 | Wang et al. | 361/697 |
| 2003/0081382 A1 * | 5/2003 | Lin | 361/697 |
| 2003/0151900 A1 * | 8/2003 | Ku | 361/719 |
| 2006/0082966 A1 * | 4/2006 | Lev et al. | 361/687 |
| 2006/0267192 A1 * | 11/2006 | Chen | 257/724 |

FOREIGN PATENT DOCUMENTS

| | | |
|---|---|---|
| CN | 01271513.1 | 10/2002 |
| CN | 1536657 A | 10/2004 |

* cited by examiner

*Primary Examiner*—Boris L Chervinsky
(74) *Attorney, Agent, or Firm*—Frank R. Niranjan

(57) ABSTRACT

A heat dissipation assembly (100) is provided. The heat dissipation assembly (100) comprises a chassis (20) of an electronic product, a heat sink (10) having a bottom portion thereof being insert-molded with the chassis (20) so that the heat sink (10) and the chassis (20) are integrally connected together as a single piece, a base (30) secured to the chassis (20) and having a top surface (32) thermally connecting with a heat generating electronic unit of the electronic product and a bottom surface (34) thermally connecting with the chassis (20), a fan (40) used for cooling the heat sink (10), and a heat pipe (50) having an evaporator section (52) connected with the base (30) and a condenser section (54) connected with the heat sink (10).

17 Claims, 3 Drawing Sheets

HEAT DISSIPATION ASSEMBLY

FIELD OF THE INVENTION

The present invention relates to a heat dissipation assembly, and more specifically to a heat dissipation assembly having an improved heat transfer ability for use with portable electronic products.

DESCRIPTION OF RELATED ART

With the continuing development of computer technology, electronic components such as central processing units (CPUs) of computers are being made to operate at higher operational speeds and to have greater functional capabilities. When a CPU operates at a high speed in a computer enclosure, its temperature increases rapidly. To avoid damage to the CPU, heat generated by the CPU must be dissipated quickly, which can be done by, for example, using a heat dissipation assembly attached to a surface of the CPU to absorb the heat from the CPU. The heat absorbed by the heat dissipation assembly is then dissipated to ambient air.

Conventionally, a heat dissipation assembly comprises a base, a heat sink, a heat pipe interconnecting the base and the heat sink, and a fan. The base, the heat sink and the fan are secured by clips. Portable electronic products such as notebook computers should have a small volume and a light weight. However, the clips will increase the volume and the weight of the portable electronic products.

Therefore, an improved heat dissipation assembly which can overcome the above problem is desired.

SUMMARY OF THE INVENTION

The present invention relates to a heat dissipation assembly. In accordance with an embodiment, the heat dissipation assembly comprises: a chassis of an enclosure of an electronic product in which a heat generating electronic unit is enclosed, a heat sink having a bottom portion thereof being insert-molded with the chassis so that the heat sink and the chassis are integrally connected with each other as a single piece, a base having a top surface thermally connecting with the heat generating electronic unit, a fan generating an airflow for cooling the heat sink, and a heat pipe having an evaporator section and a condenser section. The evaporator section thermally connects with the base and the condenser section thermally connects with the heat sink.

Other advantages and novel features of the present invention can be drawn from the following detailed description of a preferred embodiment of the present invention, in which:

DETAILED DESCRIPTION OF THE INVENTION

Figure 1:
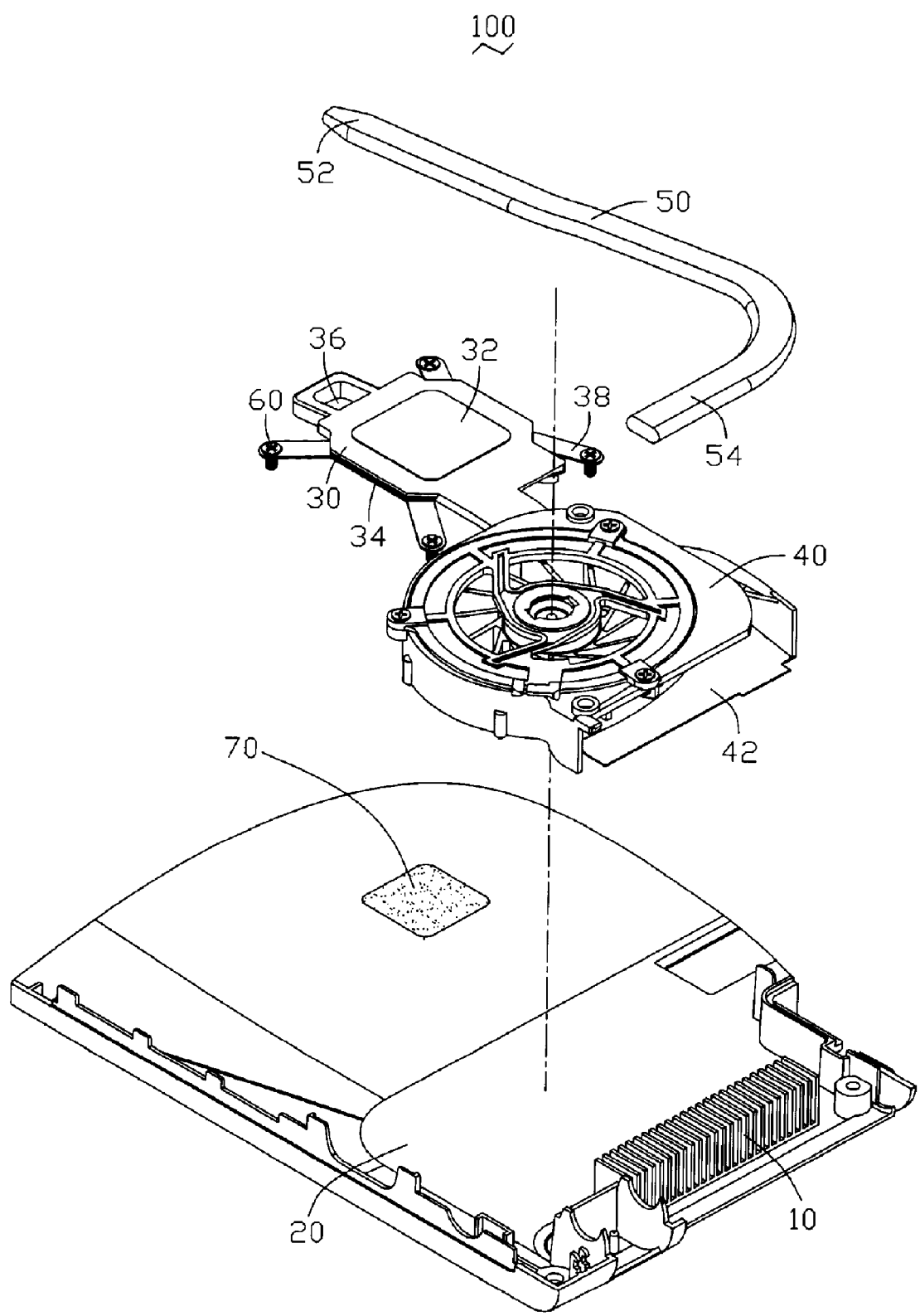
FIG. 1 is an exploded view of a heat dissipation assembly in accordance with a first preferred embodiment of the present invention.

Referring to FIG. 1, a heat dissipation assembly 100 in accordance with a first preferred embodiment of the present invention comprises a heat sink 10, a chassis 20, a base 30, a fan 40 and a heat pipe 50. In this embodiment, the chassis 20 is a part of an enclosure of a portable electronic product such as a notebook computer. The chassis 20 is made of a metal with a high heat conductive capability; the metal can be selected from magnesium, aluminum, zinc et al., and their alloys.

The base 30 is typically a copper plate and includes a top surface 32 and a bottom surface 34; the top surface 32 thermally contacts with a heat generating electronic unit (not shown) such as a CPU of the notebook computer, and the bottom surface 34 defines a receiving groove 36 therein. The base 30 forms four locking arms 38 at four corners thereof; the locking arms 38 extend outwardly from the base 30, and the base 30 is secured to the chassis 20 by a plurality of fasteners such as screws 60 fitted in free ends of the locking arms 38, respectively.

The fan 40 is a centrifugal blower and defines an outlet 42 at a lateral side thereof, and the fan 40 connects to and is located at one side of the base 30.

The heat pipe 50 is substantially L-shaped and has an evaporator section 52 and a condenser section 54.

Figure 2:
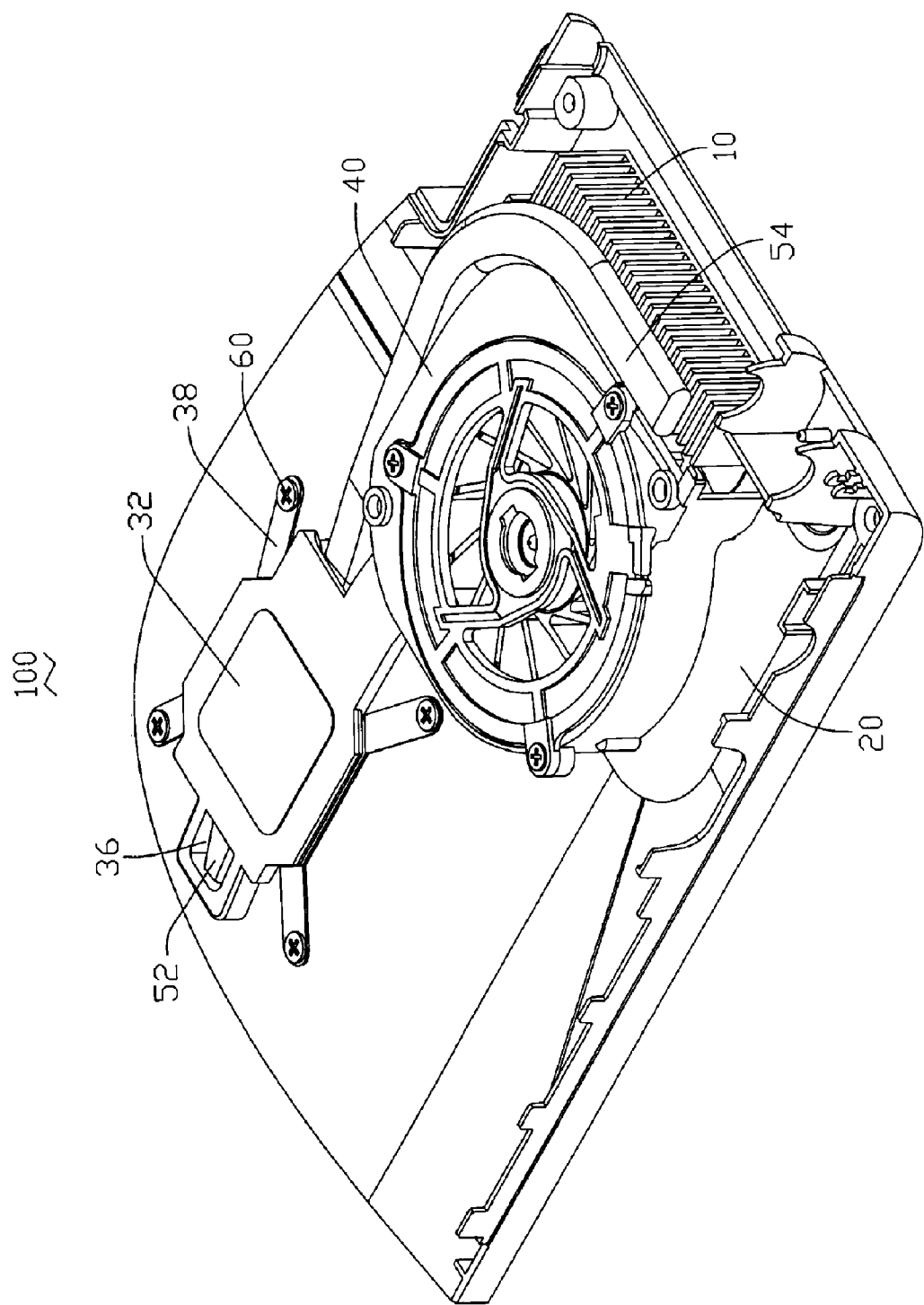
FIG. 2 is an assembled view of the heat dissipation assembly of FIG. 1.

Referring to FIG. 1 and FIG. 2, the base 30 is secured to the chassis 20. Each locking arm 38 of the base 30 is fastened to the chassis 20 through a corresponding screw 60, and the bottom surface 34 of the base 30 physically and thermally contacts with the chassis 20. For reducing a thermal resistance between the base 30 and the chassis 20, a thermal interface material such as a thermal grease 70 having a good heat transfer ability is employed between the base 30 and the chassis 20. The outlet 42 of the fan 40 corresponds to the heat sink 10, and the fan 40 forcibly cools the heat sink 10 when the fan 40 is operated to generate an airflow. The evaporator section 52 of the heat pipe 50 is received in the receiving groove 36 of the base 30, and the condenser section 54 of the heat pipe 50 is attached to a top surface of the heat sink 10. Typically, the condenser section 54 is soldered to the heat sink 10.

The heat sink 10 is located near to an edge portion of the chassis 20 and is made of a metallic material such as copper, copper alloy, aluminum or aluminum alloy. The heat sink 10 is insert-molded with the chassis 20 so that the heat sink 10 and the chassis 20 are integrally connected together as a single piece. In order to achieve this object, the heat sink 10 as an insert piece is placed into a cavity of a mold. Then, a molten metal or metal alloy used to form the chassis 20 is injected into the cavity and around a bottom portion of the heat sink 10. After the molten material is solidified, the bottom portion of the heat sink 10 is encapsulated by the material of the chassis 20. Thus, the chassis 20 and the heat sink 10 are connected and integrated together, and the heat sink 10 is fixed to the chassis 20 without using clips or fasteners. Because the heat sink 10 is integrated with the chassis 20, a thermal resistance between the heat sink 10 and the chassis 20 is relatively low, and the heat transferred to the heat sink 10 can be further quickly transferred to the chassis 20 for dissipation.

In the insert molding process, the bottom portion of the heat sink 10 should has a melting point higher than a melting point of the material used to form the chassis 20 so that, during the insert molding process, the bottom portion of the heat sink 10 will not melt due to the high temperature of the molten metal or metal alloy used for forming the chassis 20. For example, if the chassis 20 is made of magnesium, aluminum, zinc or their alloys, the heat sink or the bottom portion of the heat sink can be made of copper or copper alloy. In the illustrated embodiment, the heat sink 10 includes a basis (not labeled) and a plurality of fins (not labeled) integrally formed with and extending upwardly from the basis. Alternatively, the fins can be formed separately from the basis and thereafter attached to the basis by soldering. Also, the heat sink 10 can includes a plurality of fins that are combined with each other by interlocking devices such as hooks and holes formed thereon. Furthermore, the heat sink 10 can omit the basis and includes only a plurality of fins that are combined with each other.

In use of the heat dissipation assembly 100, the base 30 absorbs heat from the heat generating electronic unit via the top surface 32 of the base 30. The base 30 delivers the heat simultaneously to the chassis 20 and the heat pipe 50. A portion of the heat is dissipated directly by the chassis 20. The evaporator section 52 of the heat pipe 50 absorbs another portion of the heat from the base 30 and then delivers the heat to the condenser section 54 of the heat pipe 50. The heat delivered to the condenser section 54 is subsequently transferred to the heat sink 10 for being dissipated. The fan 40 drives an airflow to forcibly dissipate the heat transferred to the heat sink 10 to an outside atmosphere of the chassis 20. Since the heat sink 10 is integrally formed with the chassis 20, a part of the heat transferred to the heat sink 10 is also further transferred to the chassis 20 for dissipation. Because the chassis 20 is made of a metal or a metal alloy with high heat conductivity, and the chassis 20 has a large heat dissipation surface, the heat transferred to the chassis 20 can be dissipated quickly. Therefore, the present heat dissipation assembly 100 has a high heat dissipation efficiency.

Figure 3:
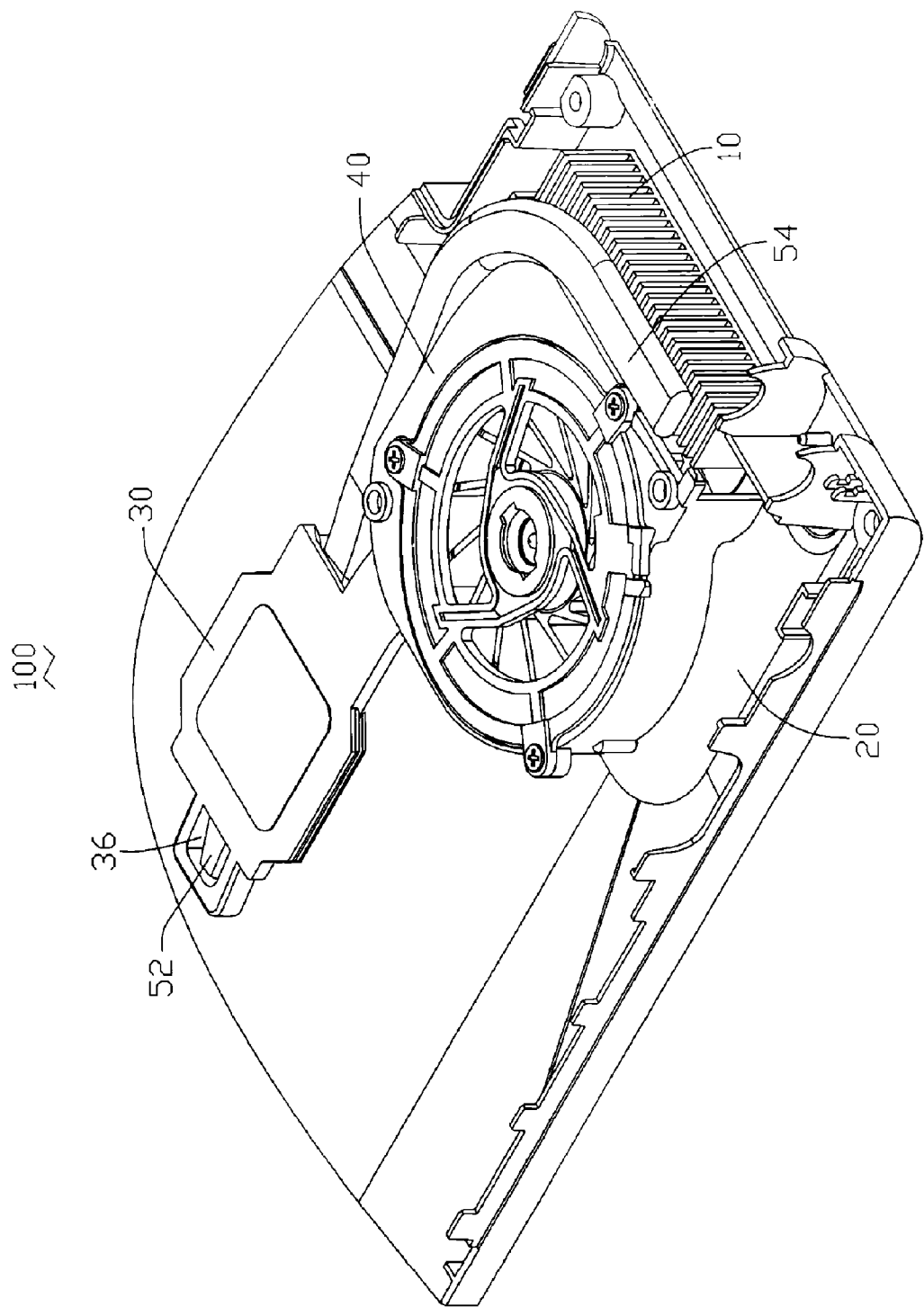
FIG. 3 is an assembled view of a heat dissipation assembly in accordance with a second preferred embodiment of the present invention.

FIG. 3 is a view showing an alternative embodiment of the heat dissipation assembly 100 of the present invention. In this alternative embodiment, the base 30 is also insert-molded with the chassis 20 by using the aforementioned insert molding process, and the base 30 is therefore capable of being fixed to the chassis 20 without using the locking arms and screws. After the base 30 and the chassis 20 are integrally connected with each other as a single piece by the insert molding process, the evaporator section 52 of the heat pipe 50 is inserted into the receiving groove 36 of the base 30 and soldered therein.

From the above description of the embodiments of the present invention, it is obvious that the heat sink 10 and the base 30 can be secured to the chassis 20 without using clips or any other fasteners, to thereby decrease the weight and volume of the heat dissipation assembly 100, and enhance the heat dissipation efficiency of the heat dissipation assembly 100.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A heat dissipation assembly comprising:
    a chassis of an enclosure of an electronic product in which a heat generating electronic unit is adapted to be enclosed;
    a heat sink having a bottom portion thereof being insert-molded with said chassis so that the heat sink and said chassis are integrally connected with each other as a single piece;
    a base having a top surface adapted for thermally connecting with the heat generating electronic unit;
    a fan generating an airflow for cooling said heat sink; and
    a heat pipe having an evaporator section and a condenser section, the evaporator section thermally connecting with said base and the condenser section thermally connecting with said heat sink, wherein said base has a bottom surface, the bottom surface of said base physically and thermally contacts with said chassis.

2. The heat dissipation assembly as described in claim 1, wherein a thermal interface material is employed between said base and said chassis.

3. The heat dissipation assembly as described in claim 1, wherein said base is insert-molded with said chassis so that said base and said chassis are integrally connected with each other as a single piece.

4. The heat dissipation assembly as described in claim 1, wherein said base defines a receiving groove therein, and the evaporator section of said heat pipe is received in the receiving groove of said base.

5. The heat dissipation assembly as described in claim 1, wherein said base has a plurality of locking arms, and said base is secured to said chassis by the locking arms.

6. The heat dissipation assembly as described in claim 1, wherein the condenser section of said heat pipe is attached to a top surface of said heat sink.

7. The heat dissipation assembly as described in claim 1, wherein the condenser section of said heat pipe is soldered to said heat sink.

8. The heat dissipation assembly as described in claim 1, wherein said heat sink is located near to an edge portion of said chassis.

9. The heat dissipation assembly as described in claim 1, wherein said fan is connected with said base and located at one side of said base.

10. The heat dissipation assembly as described in claim 1, wherein the bottom portion of said heat sink is made of copper and said chassis is made of one of magnesium, aluminum, zinc and their alloys.

11. A method of producing a heat dissipation assembly for use with an electronic unit enclosed in an enclosure of an electronic product, the enclosure having a chassis, the method comprising steps of:
    insert molding a heat sink with said chassis so that said heat sink and said chassis are integrally connected with each other as a single piece and the heat sink is enclosed in the enclosure of the electronic product;
    thermally attaching a thermally conductive base to said electronic unit;
    mounting a fan at a side of said heat sink; and
    thermally interconnecting said base with said heat sink by using a heat pipe.

12. The method as described in claim 11, further comprising a step of securing said base to physically and thermally contact with said chassis and a step of applying a thermal interface material between said base and said chassis.

13. The method as described in claim 11, further comprising a step of insert molding said base with said chassis so that said base and said chassis are integrally connected with each other as a single piece.

14. The method as described in claim 11, wherein said heat pipe is substantially L-shaped and includes an evaporator section received in a groove defined in said base and a condenser section attached to a top of said heat sink.

15. A heat dissipation assembly comprising:
    a chassis of an enclosure of an electronic product in which a heat generating electronic unit is adapted to be enclosed;
    a heat sink having a bottom portion thereof being insert-molded with said chassis so that the heat sink and said chassis are integrally connected with each other as a single piece;

a base secured to the chassis and having a top surface adapted for thermally connecting with the heat generating electronic unit;

a fan generating an airflow for cooling said heat sink; and a heat pipe having an evaporator section and a condenser section, the evaporator section thermally connecting with said base and the condenser section thermally connecting with said heat sink, wherein said base has a bottom surface, the bottom surface of said base physically and thermally contacts with said chassis.

16. The heat dissipation assembly as described in claim 15, wherein the base has a plurality of locking arms each be fitted with a screw, the screws threadedly engage with the chassis thereby securing the base to the chassis.

17. The heat dissipation assembly as described in claim 15, wherein the base is insert-molded with the chassis as a single piece.

\* \* \* \* \*